United States Patent
Fukada

(10) Patent No.: US 8,810,832 B2
(45) Date of Patent: Aug. 19, 2014

(54) IMAGE PROCESSING APPARATUS AND METHOD FOR CONTROLLING THE APPARATUS

(75) Inventor: Hiroshi Fukada, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 13/007,388

(22) Filed: Jan. 14, 2011

(65) Prior Publication Data

US 2011/0194145 A1 Aug. 11, 2011

(30) Foreign Application Priority Data

Feb. 9, 2010 (JP) .................................. 2010-026999

(51) Int. Cl.
*G06F 3/12* (2006.01)

(52) U.S. Cl.
USPC .......................... 358/1.15; 358/1.13; 358/1.18

(58) Field of Classification Search
USPC ....................... 358/1.9, 1.15, 1.13, 1.16, 1.18; 715/760, 239, 243, 273, 274, 744, 781; 709/203, 219

See application file for complete search history.

(56) References Cited

U.S. PATENT DOCUMENTS

| | | | |
|---|---|---|---|
| 2007/0086051 A1* | 4/2007 | Kunori | 358/1.15 |
| 2010/0014103 A1* | 1/2010 | Lee et al. | 358/1.9 |
| 2010/0199197 A1* | 8/2010 | Faletski et al. | 715/760 |

FOREIGN PATENT DOCUMENTS

JP 2007-272544 A 10/2007

* cited by examiner

*Primary Examiner* — Vu B Hang

(74) *Attorney, Agent, or Firm* — Fitzpatrick, Cella, Harper & Scinto

(57) ABSTRACT

The present invention provides a technology allowing a user to selectively print a web page for a mobile terminal or for a PC. To accomplish this, an image processing apparatus connected to a mobile terminal and a web server accepts designation information, which designates how a web page is printed, when both a first web page for a mobile terminal and a second web page for a non-mobile terminal are present in the web page, receives page information containing the URL of the first web page from the mobile terminal, obtains the second web page corresponding to the first web page from the web server, and executes any one of printing of the first web page, printing of the second web page, and printing of both the first web page and the second web page, according to the accepted designation information.

7 Claims, 5 Drawing Sheets

IMAGE PROCESSING APPARATUS AND METHOD FOR CONTROLLING THE APPARATUS

BACKGROUND OF THE INVENTION

1. Field of the Invention

The present invention relates to an image processing apparatus that prints web pages through cooperation with mobile terminals, and a method for controlling the apparatus.

2. Description of the Related Art

An image processing apparatus that cooperates with mobile phones and can print web pages received via the mobile phones has recently been proposed as an example of an application of mobile terminals. Some web servers that provide web pages have web pages for mobile terminals, to be provided to a web browser included in a mobile phone, and web pages for PCs, to be provided to a web browser included in a PC. In some cases, the web page for a mobile terminal and the web page for a PC have an identical URL. Japanese Patent Laid-Open No. 2007-272544 describes that, when printing a web page received via a mobile phone, if there is a web page for a PC using the same URL as the web page for a mobile terminal, the web page for a PC is used.

In the conventional technique, however, when web pages for a PC are printed, mobile phones should additionally have the function of browsing web pages for a PC. Further, when printing of unaltered images of web pages for mobile terminals during browsing through mobile phones by users is desired, disadvantageously, web pages for PCs are sometimes printed against their intention. Furthermore, when a PC is connected to an image processing apparatus, printing undesired by users is sometimes performed because it is not clearly established how to sort a printing instruction from a PC from a printing instruction from a mobile terminal.

SUMMARY OF THE INVENTION

The present invention enables realization of selective printing of web pages for mobile terminals or web pages for PCs by users.

One aspect of the present invention provides an image processing apparatus connectable to a mobile terminal and a web server, the image processing apparatus comprising: an acceptance unit that accepts designation information, which designates how printing of a web page is executed, when both a first web page for a mobile terminal and a second web page for a non-mobile terminal are present in the web page; an information receiving unit that receives page information containing the URL of the first web page from the mobile terminal; an obtaining unit that obtains, from the web server, the second web page corresponding to the first web page based on the page information; and a printing unit that executes any one of printing of the first web page, printing of the second web page, and printing of both the first web page and the second web page based on the designation information accepted by the acceptance unit.

Another aspect of the present invention provides a method for controlling an image processing apparatus connectable to a mobile terminal and a web server, the method comprising: in an acceptance unit, accepting designation information, which designates how printing a web page is executed, when both a first web page for a mobile terminal and a second web page for a non-mobile terminal are present in the web page; in an information receiving unit, receiving page information containing the URL of the first web page from the mobile terminal; in an obtaining unit, obtaining, from the web server, the second web page corresponding to the first web page based on the page information; and in a printing unit, executing any one of printing of the first web page, printing of the second web page, and printing of both the first web page and the second web page based on the designation information accepted by the acceptance unit.

Still another aspect of the present invention provides a computer-readable storage medium storing a computer program that causes a computer to execute the method of controlling the image processing apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>

Figure 1:
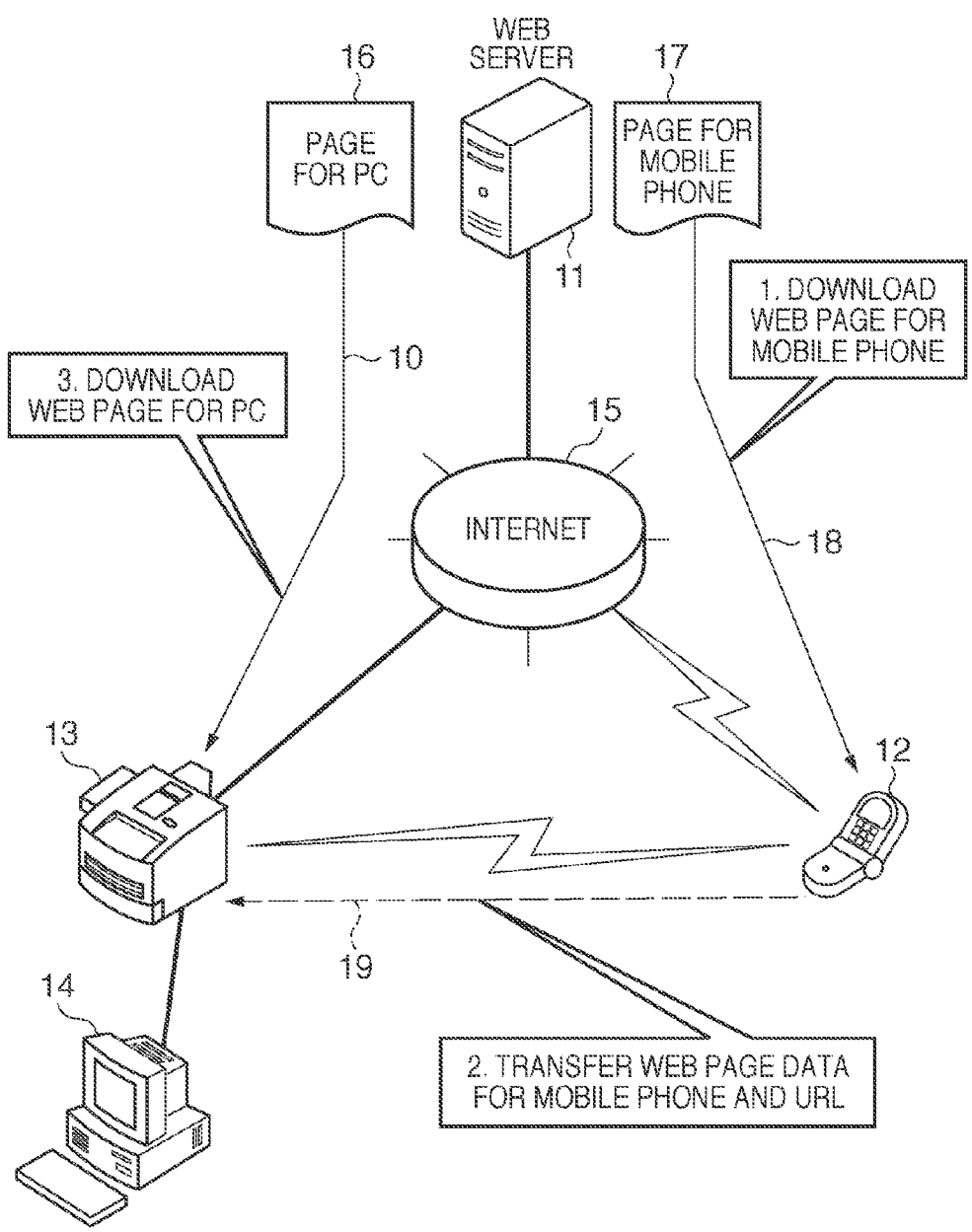
FIG. 1 illustrates a block diagram of a system including an image processing apparatus as one embodiment of the present invention.

FIG. 1 is a block diagram for explaining a system configuration including a multi function peripheral (hereinafter referred to as "MFP") 13 that is an image processing apparatus of this embodiment. A web server 11 distributes web pages. The web server 11 distributes web pages including HTML data, PING, image data such as JPEG, and scripts of JAVA (registered trademark) to clients when requests come via http protocol from the clients via the Internet.

A mobile phone 12, which is a mobile terminal, has a browsing function through which web pages received from the web server 11 through connection to the Internet 15 are displayed on a display of the mobile phone 12 (hereinafter referred to as a "mobile browser"). The MFP 13 has a function through which USB interface connection with a PC 14 as described below, cable LAN connection, and wireless communication connection with mobile phones, infrared data association (IrDA), Bluetooth and the like can be realized. Further, a browsing function through which web pages are received from the web server 11 through connection to the Internet 15 and are converted into screen images (hereinafter referred to as "PC browser") is installed on the MFP 13.

A PC 14, which is an information processing apparatus, is connected to the MFP 13 via a USB interface. A main purpose of connecting the PC 14 with the MFP 13 is to allow the MFP 13 to print file data and image data through an instruction of printing from the PC 14. The Internet 15 comprises carriers such as FTTH and ADSL and various components such as ISP and Internet connection.

Data 16 in web pages for non-mobile terminals (second web pages) directed mainly to PC clients (hereinafter referred to as web pages for "PC") are stored in the web server 11 and include HTML data, PING, image data such as JPEG, and scripts of JAVA (registered trademark). Data 17 in web pages for mobile terminals (first web pages) directed mainly to mobile phone clients (hereinafter referred to as "web pages for mobile terminals") are also stored in the web server 11 and include HTML data, PING, image data such as JPEG, and scripts of JAVA (registered trademark).

It is assumed that the web server 11 according to this embodiment, can provide a web page 16 for PCs and a web page 17 for mobile terminals using a single URL. Generally the web server determines a difference between http requests from a PC browser and http requests from a mobile browser in the following manner.

A. Determination by User Agent

A browser sends user agent information together with http requests to a web server. Available user agents are fixed for respective browsers. For example, for PC browsers, it may be Mozilla (registered trademark)/4.0 when Internet Explorer (registered trademark) or Firefox (registered trademark) is used; and may be Opera/7.11 when Opera (registered trademark) is used. For mobile browsers, it may be Docomo (registered trademark)/1.0 when mobile phones manufactured by NTT Docomo are used; and may be SoftBank/1.0 (registered trademark) when mobile phones manufactured by Softbank are used (note; ** represents model name). A web server determines the browser from which an http request has come by referring to these user agents.

B. Determination by IP Address

In access to the Internet through mobile phones, an IP address range of a server is limited to some extent due to access via a server of a mobile phone. The web server can check the IP address through which the http request has come to determine whether or not the browser is a mobile browser.

C. Determination by Both User Agent and IP Address

Some web servers determine a browser using the determination described in both A and B above.

Which determination method among A, B, and C is used depends upon the setting of the web server. Web server setting without browser determination is also possible. In this case, an identical web page is distributed independently of whether the origin of the http request is a PC browser or a mobile browser.

As described above, when an http request for a certain URL has come, a web server determines a browser of a client according to the web server setting. According to the determination result, the web server performs control so that either the web page for a PC or the web page for a mobile terminal is distributed to the client.

Figure 2:
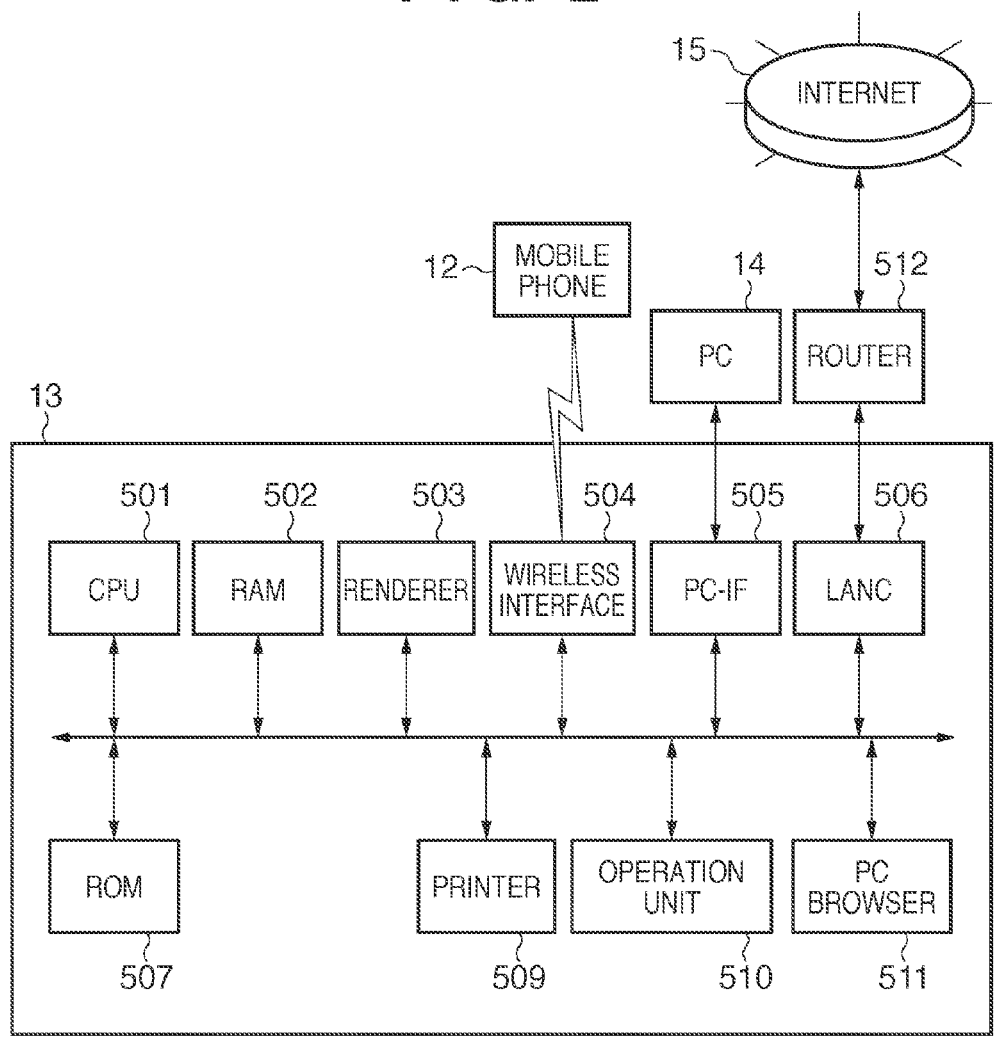
FIG. 2 is a block diagram illustrating a system configuration of an MFP.

FIG. 2 is a block diagram illustrating a system configuration of an MFP 13. A CPU 501 is a controller that controls the whole system. A RAM 502 is a system work memory that allows the CPU 501 to operate. The RAM 502 is backed up by a battery and stores the user setting contents of various functions of the MFP 13. The RAM 502 temporarily stores web pages and URLs received from the mobile phone 12, data received from the PC 14, and print data rendered for printing.

A ROM 507 stores system programs that allow the CPU 501 to operate. A printer 509 prints print data subjected to image processing by a renderer 503 on paper. An operation unit 510 mainly includes a key board as an input means and a display as an output means.

The renderer 503 executes conversion of data being input for printing from the mobile phone 12 or PC 14 to print data in a format suitable for the printer 509. A wireless interface 504 performs wireless data transmission to and wireless data reception from the mobile phone 12. Generally wireless interface with the mobile phone 12 is executed by infrared communication IrDA, Bluetooth or the like.

A PC interface 505 performs wire data transmission to and wire data reception from the PC 14. In this embodiment, an USB interface is used. A LAN controller 506 is connected to a LAN such as Ethernet (registered trademark) to perform data transmission and reception. A PC browser 511 sends a request for a download of web pages to a web server designated by a specific URL located on the Internet. Further, the PC browser 511 converts a web page described in HTML downloaded upon the request for downloading into a screen image that can be understood by users. A router 512 is connected to both the LAN and the WAN (Internet) and channels communications between the MFP 13 and the Internet 15.

Figure 3:
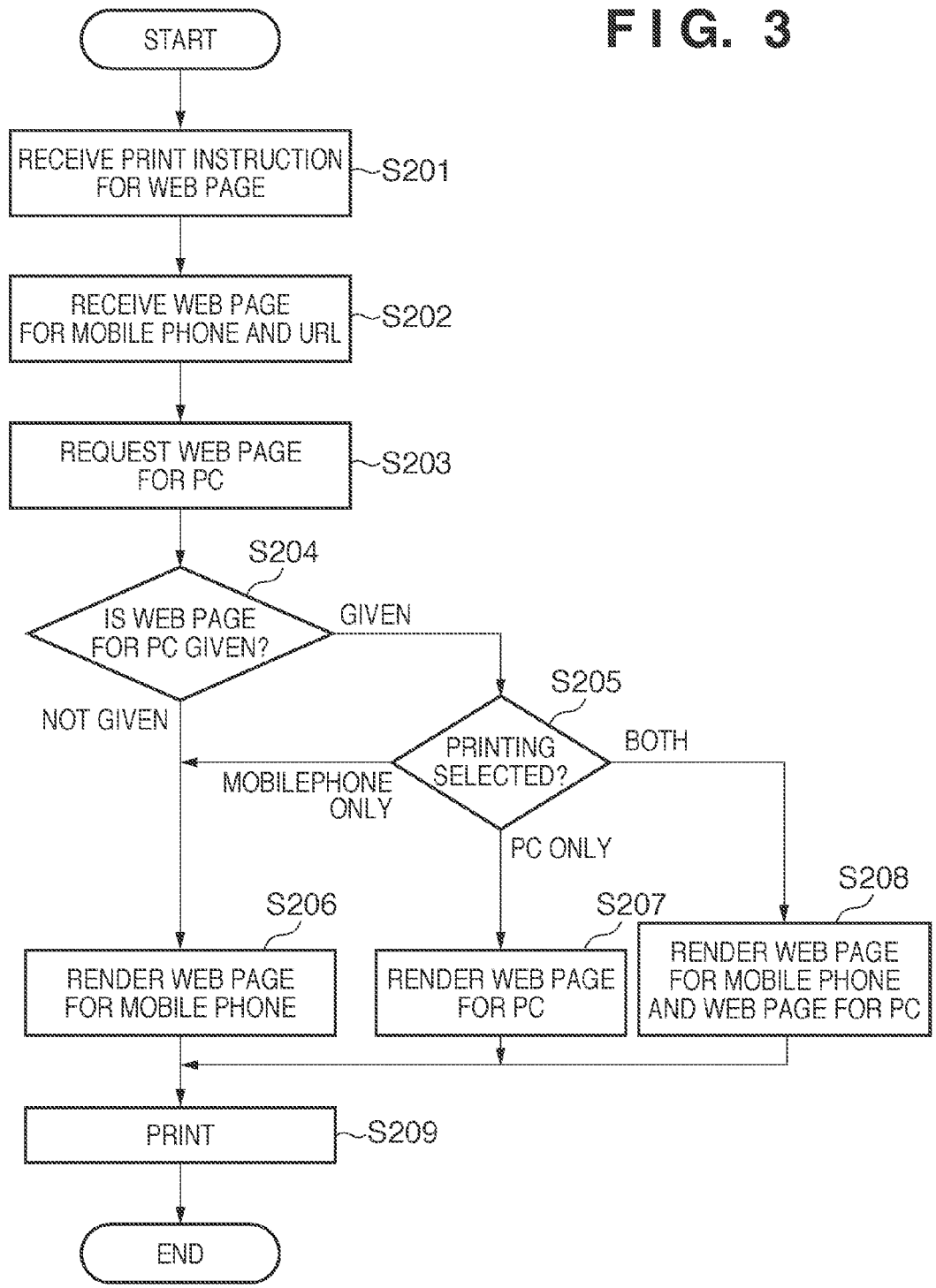
FIG. 3 is a flow chart of MFP control through an instruction of printing web pages from mobile phones.

FIG. 3 is a flow chart of control flow of the MFP 13 according to an instruction of printing web pages from the mobile phone 12. The procedures shown by the flow chart are stored in the ROM 507 and are executed by the CPU 501. At S201, the MFP 13 receives a print instruction of a web page being browsed from the mobile phone 12 by an instruction receiving unit via the wireless interface 504. The print instruction of a web page is executed by a user who is browsing a web page for mobile terminals with the browser of the mobile phone 12 sending the print instruction of the web page to the MFP 13 with an operation of the mobile phone 12.

At S202, the MFP 13 receives a web page 17 (FIG. 1) for mobile terminals and the URLs thereof as page information from the mobile phone 12 with an information receiving unit via the wireless interface 504. The web page 17 for mobile terminals received from the mobile phone 12 is in many cases source data described in html, and bit map image data obtained by screen-capturing images on a display with a mobile browser.

At S203, the MFP 13 requests a download of a web page 16 (FIG. 1) for a PC with a PC browser 511 compatible with URL information received at S202. The request for downloading is usually executed through http protocols, and the request is sent to the web server 11 specified by URL information located on the Internet, via the LAN controller 506 and the router 512.

At S204, the MFP 13 branches processing according to the availability of downloading of a web page 16 (FIG. 1) for a PC in response to the request for downloading at S203. In the case where a web page 16 for a PC cannot be obtained by downloading due to the absence of a web page 16 for a PC, or in the case where, even though the web page can be successfully downloaded, the downloaded web page is the same as the web page 17 (FIG. 1) for mobile terminals received from the mobile phone 12 at S202, the MFP 13 determines that the web page for a PC is absent, and then the procedure goes to S206. In the case where the downloaded web page 16 for a PC is different from the web page 17 for mobile terminals, the MFP 13 determines that a web page for a PC is present, and then the procedure goes to S205.

At S205, the MFP 13 branches processing according to a selected and designated print layout. Specifically, the processing is branched to S206 when the web page only for mobile is printed; the processing is branched to S207 when the web page only for a PC is printed; and the processing is branched to S208 when both the web page for mobile and the web page for a PC are printed. One selecting and designating method is to allow a user to select a print layout from the operation unit every time when the web page is printed. Another selecting and designating method includes accepting designation information of a print layout for web page printing transmitted from a user through a PC 14 or a mobile phone 12, setting and storing the designation information in a previously backed-up RAM 502 or ROM 507, and reading out the setting from the RAM 502 or ROM 507 every time when the web page is printed.

Figure 4:
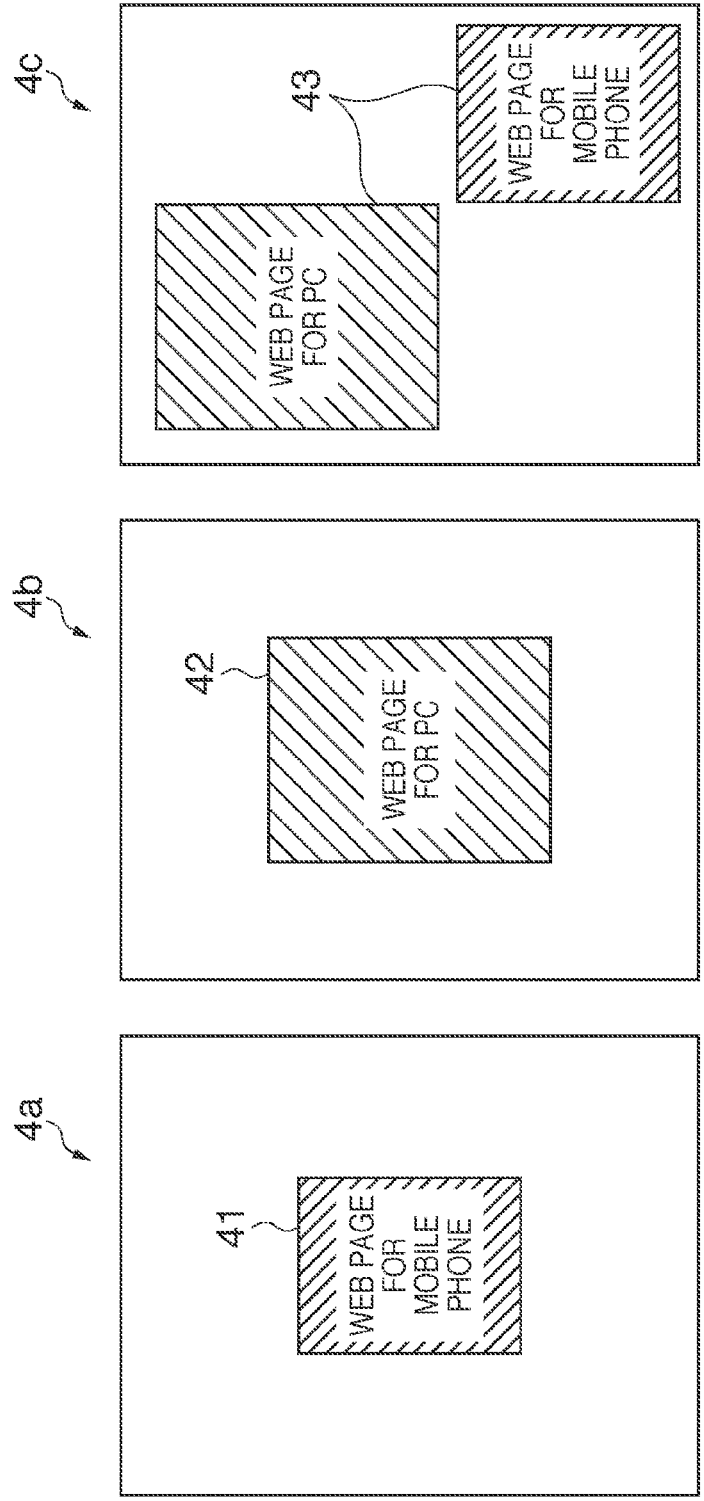
FIG. 4 is a diagram illustrating an image of print results when printing of a web page for a mobile terminal, printing of a web page for a PC, or printing of both a web page for a mobile terminal and a web page for a PC is selected.

At S206, the MFP 13 renders the web page 17 for mobile terminals with the renderer 503. 4a of FIG. 4 illustrates an image of a printing result when printing of the web page for a mobile phone is selected in the printing of the web page from the mobile phone 12. At S207, the MFP 13 renders a web page 16 for mobile terminals with the renderer 503. 4b of FIG. 4 illustrates an image of a printing result when printing of the web page for a PC is selected in the printing of the web page from the mobile phone 12.

At S208, the MFP 13 renders web pages 17 for mobile terminals and web pages 16 for PCs with the renderer 503 so that these web pages are laid out on the same page. 4c of FIG. 4 illustrates an image of a printing result when simultaneous printing of both the web page for a mobile phone and the web page for a PC is selected in the printing of the web page from the mobile phone 12. At S209, the MFP 13 executes printing of print data rendered at any of S206, S207, or S208 with the printer 509, which is a print executing unit.

The construction of the first embodiment can eliminate the need to use a browsing function for a PC in the mobile phone, and, at the same time, the print result of a web page meeting the user's intention can be realized.

<Second Embodiment>

In the first embodiment, it is not clear to the MFP 13 whether print instruction comes from the PC 14 or the mobile phone 12. In the second embodiment, a configuration of printing of a web browser will be described in which a plurality of print instructions is sorted. In a print instruction from the PC 14, no communication of web pages and URLs is carried out but communication of intermediate data for printing, and image data is carried out. The configuration of the MFP 13 is the same as that in FIG. 2. Accordingly, in this embodiment, points different from the first embodiment are mainly described in the present embodiment.

Figure 5:
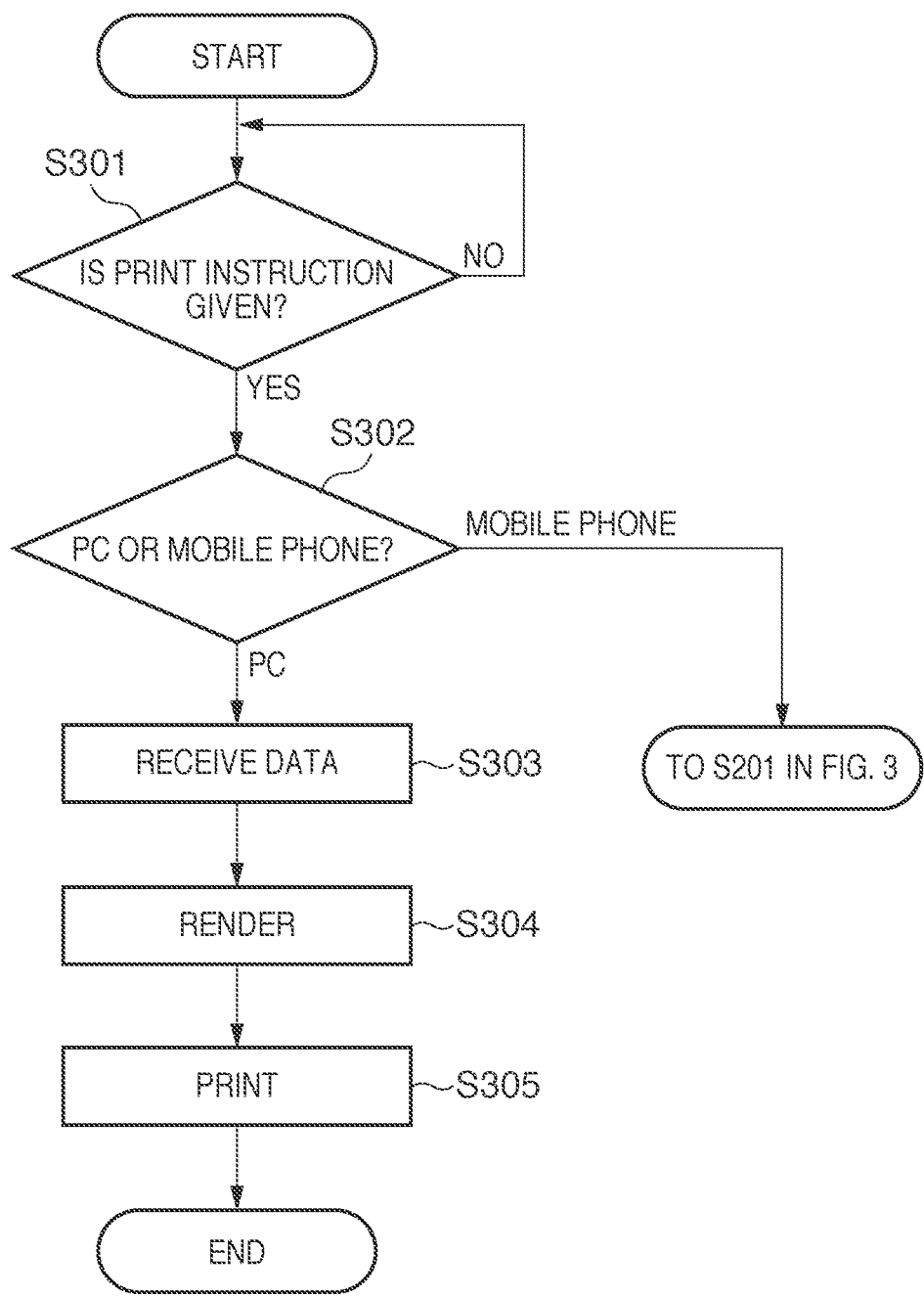
FIG. 5 is a flow chart of MFP control through an instruction of printing from mobile phones or PCs.

FIG. 5 illustrates a control flow of the MFP 13 according to a print instruction from the mobile phone 12 or PC 14. The procedures indicated by the flow chart are stored in the ROM 507 shown in FIG. 2, and executed by the CPU 501. At S301, the MFP 13 waits for a print instruction either from the mobile phone 12 or PC 14, and loops until a print instruction is issued.

At S302, when an instruction of printing is issued, the MFP 13 determines whether the instruction is from the mobile phone 12 or PC 14. The determination is executed by the CPU 501 according to a program, and the procedure goes to the flow chart in FIG. 2 when the print instruction has been determined to be from the mobile phone 12. On the other hand, when the print instruction is from the PC 14, the procedure goes to step S303.

At S303, the MFP 13 receives data for printing from the PC 14. At S304, the MFP 13 converts data received from the PC 14 into print data with the renderer 503. At S505, the MFP 13 prints the converted print data with the printer 509.

When the construction of the second embodiment is adopted, proper processing can be executed for each print instruction because the MFP 13 can change the control dependent upon whether the print instruction is from the PC 14 or from the mobile phone 12.

<Other Embodiments>

Although the above embodiments describe a mobile phone as one example of mobile terminals, the terminal is not limited to the mobile phone and other terminals are possible.

Further, although the MFP has been described as one example of image processing apparatuses, other apparatuses may be adopted as long as they are provided with a printing function such as a printer.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer, for example, via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-026999 filed on Feb. 9, 2010, which is hereby incorporated by reference herein in its entirety.

What is claimed is:

1. An image processing apparatus connectable to a web server, the image processing apparatus comprising:
   an information receiving unit that receives, from a mobile terminal, page information containing a URL of a first web page for the mobile terminal, wherein the first web page has been displayed on the mobile terminal;
   an obtaining unit that obtains, from the web server, a second web page, for a non mobile terminal, corresponding to the first web page based on the page information;
   a displaying unit that displays an operation screen for causing a user to select at least one of printing of the first web page and printing of the second web page; and
   a printing unit that executes printing of the first web page, or printing of the second web page, in accordance with a selection of the user by using the displaying unit which has displayed the operation screen.

2. The image processing apparatus according to claim 1, further comprising an instruction receiving unit that receives print instruction about the first web page from the mobile terminal,
   wherein the information receiving unit receives the page information based on the received print instruction.

3. The image processing apparatus according to claim 1, wherein the printing unit executes printing of the first web page when the obtaining unit cannot obtain the second web page corresponding to the first web page or when an obtained second web page is the same as the first web page.

4. The image processing apparatus according to claim 2, which is connected to an information processing apparatus, and
   wherein when the instruction receiving unit further receives print instruction for a second web page from the information processing apparatus, the information receiving unit receives data from the information processing apparatus, and the printing unit converts the data into print data to execute printing.

5. A method for controlling an image processing apparatus connectable to a web server, the method comprising the steps of:

receiving, from a mobile terminal, page information containing a URL of a first web page for the mobile terminal, wherein the first web page has been displayed on the mobile terminal;

from the web server, a second web page, for a non mobile terminal, corresponding to the first web page based on the page information;

displaying an operation screen for causing a user to select at least one of printing of the first web page and printing of the second web page; and executing printing of the first web page, or printing of the second web page, in accordance with a selection of the user by using the displaying unit which has displayed the operation screen, wherein the steps are executed by a processor.

6. A non-transitory computer-readable storage medium storing a computer program that causes a computer to execute the method of controlling the image processing apparatus of claim 5.

7. The image processing apparatus according to claim 1, wherein the operation screen displayed by the displaying unit is a screen which is capable of selecting both printing of the first web page and printing of the second web page, and the printing unit executes both printing of the first web page and printing of the second web page in a case where the user has selected both printing of the first web page and printing of the second web page via the operation screen.

* * * * *